United States Patent [19]

Neuhaus

[11] Patent Number: 4,710,358
[45] Date of Patent: Dec. 1, 1987

[54] APPARATUS FOR CHANGING THE SURFACE TENSION OF CUP-LIKE CONTAINERS

[75] Inventor: Hans Neuhaus, Giffers, Switzerland
[73] Assignee: Polytype AG, Switzerland
[21] Appl. No.: 883,541
[22] Filed: Jul. 9, 1986
[30] Foreign Application Priority Data Jul. 12, 1985 [DE] Fed. Rep. of Germany ....... 3524985

[51] Int. Cl.⁴ .............................................. B01J 19/08
[52] U.S. Cl. ................. 422/186.05; 422/907; 425/174.8 E; 493/149; 493/291; 493/326; 493/467
[58] Field of Search .................... 422/907, 186, 186.04, 422/186.05; 118/620, 638, 625; 425/174, 174.8 E; 493/148, 149, 150, 291, 278, 279, 326, 467

[56] References Cited
U.S. PATENT DOCUMENTS 3,165,564  1/1965  Howle et al. .................. 493/326 X
4,028,551  6/1977  Thompson ..................... 422/186.05
4,051,044  9/1977  Sörensen ....................... 422/186.05
4,059,497  11/1977  Kolbe et al. ............... 422/186.05 X

FOREIGN PATENT DOCUMENTS 2726691  12/1977  Fed. Rep. of Germany .

Primary Examiner—John F. Terapane
Assistant Examiner—Susan Wolffe
Attorney, Agent, or Firm—McGlew and Tuttle

[57] ABSTRACT

To change the surface tension of cup-like containers by means of corona treatment, the containers are placed on a mandrel and are moved by drive wheels in such a way that the cup-like container is caused to roll off on the mandrel with the inside of the wall. Via an electrode the discharge current is supplied across the discharge gap to the cup-like container and it is removed via the mandrel, which is connected as counter-electrode. To avoid a discharge gap on the inside of the wall, the mandrel has connected to it a guide shoe which always applies against the inside of the wall.

3 Claims, 2 Drawing Figures

APPARATUS FOR CHANGING THE SURFACE TENSION OF CUP-LIKE CONTAINERS

FIELD AND BACKGROUND OF THE INVENTION

This invention relates in general to devices for treating articles prior to coating them for printing on them.

The invention relates to an apparatus for changing the surface tension of cup-like containers of round, oval or other form without corners, by corona treatment. A cup-like container rests with its inner side wall on a mandrel rotatably mounted on an axle and having a rotation-symmetrical cross-section of a diameter which is equal to or smaller than the smallest diameter of the cup-like container, and the cup-like container is effected by at least one drive wheel which is pressed onto the outer side of the wall of the cup-like container to roll off on the mandrel.

As is known, the surfaces of cup-like containers, for example of plastic, which are to be perfected e.g. by printing, have too low a surface tension, so that the adhesion of the printing inks is insufficient.

A known method for increasing the surface tension is so-called corona treatment. It is applied, among others, also for rotation-symmetrical containers, in that the container is placed on a rotating counter-electrode whose dimensions match the inner dimensions of the container to be treated, the electrode being stationary and forming a gap with the container surface to be treated. The energy from a high-frequency generator is discharged via the electrode onto the surface of the container, which is inserted on the counter-electrode. In the discharge gap, bombardment of the material surface by the formed electrons and ions takes place.

For rotation-symmetrical containers this poses no problems. But for non-rotation-symmetrical containers it is not possible with the above described apparatus to maintain the width of the discharge gap constant without great engineering expenditure.

German OS 27 26 691 shows an apparatus with which it is possible also on non-rotation-symmetrical containers to treat the surfaces of the outer wall on the corona principle. But this apparatus has the disadvantage that because of the machining tolerances the gap width cannot be kept exactly constant over the entire circumference to be treated. This then leads to the result that the discharge occurs, not uniformly distributed over the entire surface to be treated and hence fluctuations of the surface tension on the container are possible.

Equally disadvantageous is the fact that for each container form and size a set of electrodes must be made, so that the cost of using this installation for different containers increases. From cup printing machines it is known practice to place the container to be printed on a rotation-symmetrical mandrel which is mounted freely rotatable on an axle and which has a small diameter relative to the inside diameter of the container. Parallel to it a mandrel is provided which is drivable and can carry the printing block, for example. By this arrangement the wall of the container is passed between the two mandrels, hence rolling off on the freely rotatable mandrel. Now if with this arrangement a corona treatment would be made possible by appropriate redesign of the mandrels, one would notice that the surface is treated also on the inside of the container, since in portions of the container where the curvature of the wall has a large radius by comparison with the radius of the mandrel the container wall makes contact practically only on a generatrix of the mandrel, and on either side of this generatrix, as the counter-electrode has a certain width, a gap is formed too, thereby permitting bombardment by electrons and ions. Due to this, more energy must be applied if nevertheless the surface of the outer wall is to be treated uniformly and in the desired degree. Moreover, treatment of the inside of the container is usually undesired.

SUMMARY OF THE INVENTION

The invention provides an apparatus with which corona treatment of outside walls of containers of practically any form is possible while avoiding the mentioned disadvantages.

According to the invention, the mandrel is connected as counter-electrode and an electrode is associated with it. At least one guide show which is pivotable about the axle of the mandrel and is electrically connected to it. Its surface toward the inside of the wall of the cup-like container extends initially away from the mandrel in a tangential direction and is spring-supported in such a way that the guide shoe applies against the wall of the cup-like container.

In accordance with the invention, there is provided an apparatus for changing the surface tension of cup-shaped containers which may be of round, oval or other form by exposign the container to a corona treatment. With the invention, the container interior wall is supported over a mandrel which is rotatable and a guide shoe which is connected to the axle of the mandrel is positioned between the container and the mandrel. The guide shoe is electrically connected in a circuit which includes an electrode located above the article and the article is rotated so as to roll it off on the mandrel by engaging the article with a rotatable drive wheel.

Accordingly it is an object of the invention to provide an improved device for exposing articles to a corona discharge as they are moved past the stationary electrode.

A further object of the invention is to provide an apparatus for changing the surface tension of cup-like containers which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
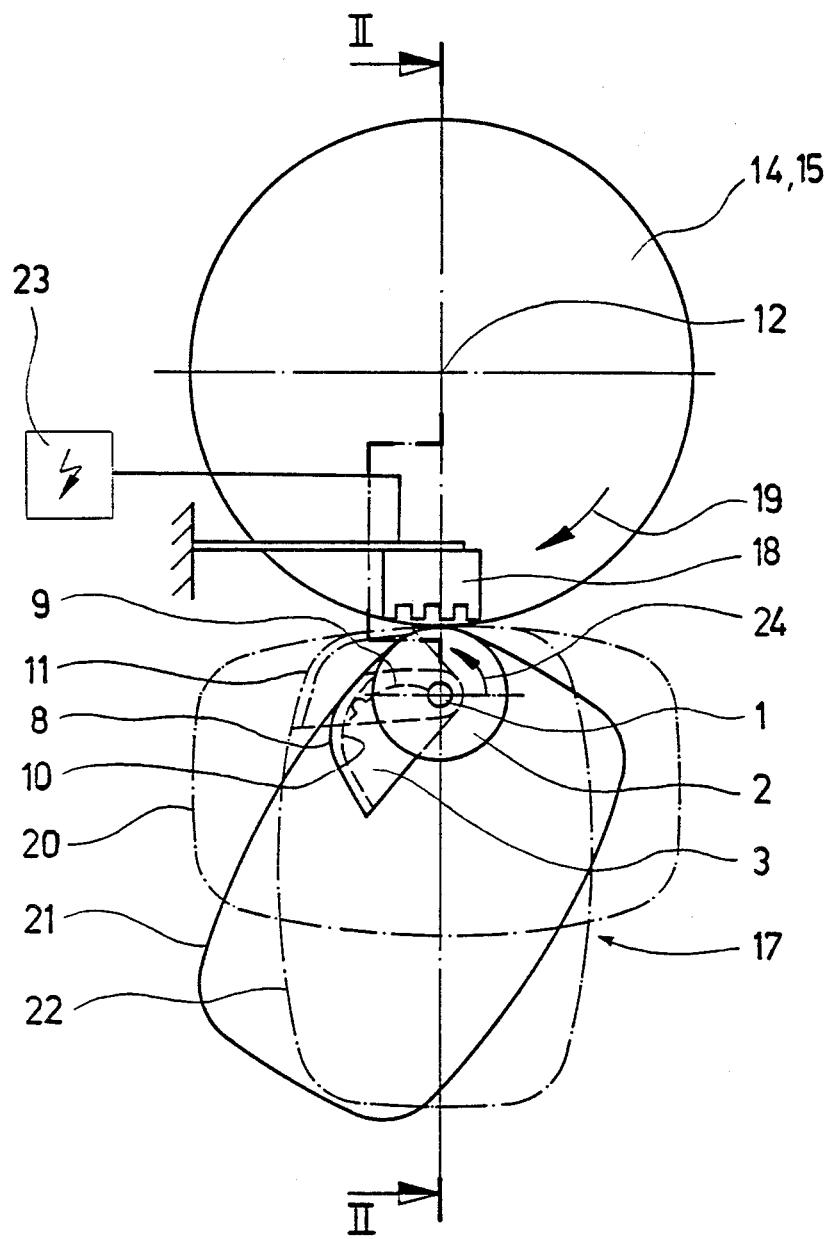
FIG. 1 is a top plan view onto an apparatus for changing the surface tension of a container illustrated in simplified form; and constructed in accordance with the invention.

Referring to the drawings in particular the invention embodied therein comprises an apparatus for changing the surface tension of a cup-like container 17 by a corona discharge which is effected by supplying current from a power source 23 to an electrode 18 as the cup-like container is rolled off on a mandrel 2 by the action of drive wheels 14 and 15 driven by a drive motor 13 through a shaft 12.

Figure 2:
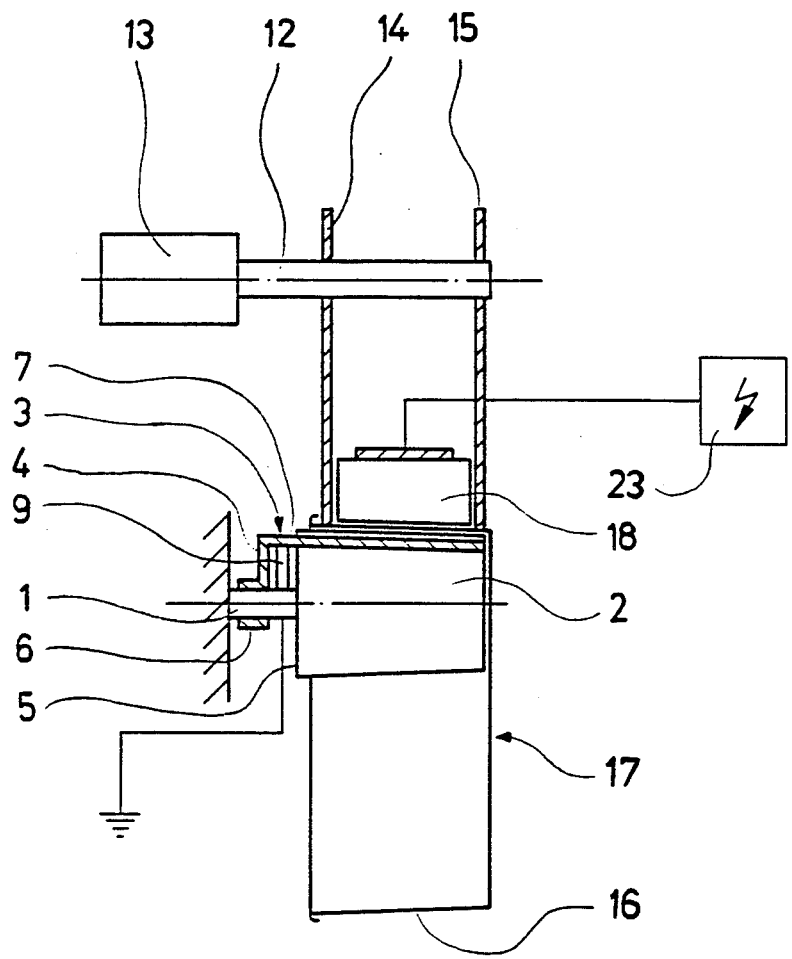
FIG. 2 is a sectional view taken along line II—II of FIG. 1.

On a machine frame (not shown) an axle 1 is arranged in such a way that it is electrically insulated from the machine frame. On this axle 1 a mandrel 2 is rotatably mounted. Also mounted on axle 1 is a guide shoe 3. A bearing bushing 6 is integrally formed on a sidewall 4 (FIG. 2) of the guide shoe 3 parallel to the base 5 of mandrel 2. The working surface 7 of guide shoe 3 is set at such an angle to the sidewall 4 that initially it extends in a tangential plane away from mandrel 2 and terminates in an arch 8 (FIG. 1). A leaf spring 9 is firmly anchored by its one end in the axle 1 and its other end presser against the inner face 10 of the guide shoe 3 and bring it into an upper position 11 shown in dot-dash lines which is determined by a fixed stop (not shown).

A shaft 12 (FIG. 2) which cna be rotated by a drive 13, is mounted on a machine unit not shown, which is displaceable relative to the machine frame and which can be varied in its angle position relative to the axle 1 and is adjustable. Mounted fixed on shaft 12 are two spaced apart drive wheels 14, 15, which spacing is adjusted to be smaller than the height of the wall 16 of the cup-like containers 17 to be treated. In an operating position, the drive wheels 14, 15 are in contact with mandrel 2. Between the drive wheels 14 and 15, an electrode 18 is provided, which likewise is fastened on the displaceable machine unit and is electrically insulted therefrom. This elecrode 18 is recessed by a certain amount relative to the rolling surfaces of the drive wheels 14 and 15 so that a discharge gap results between the surface of the cup-like container 17 to be treated and the electrode 18. The position of the multi-row electrode 18 is adjustable in known manner, (not shown).

For the corona treatment of a cup-like container 17 on its outer surface of the wall 16, the machine unit carrying the drive wheels 14 and 15 and the electrode 18 is moved into the upper position. Now the cup-like container 17 can be slipped into the mandrel 2 having become freely accessible. The drive wheels 14, 15 are lowered with the electrode 18, the drive wheels 14, 15 come into contact with the wall 16 of the cup-like container 17. The drive wheels 14, 15 are set in rotation by the drive 13 in the direction of arrow 19. The cup-like container 17 now rolls off on mandrel 2 by its wall 19 in the direction of arrow 24. Thereby the positions 20, 21, 22 shown in FIG. 1 are run through. Simultaneously with the start of rotation of the drive wheels 14, 15 a high-frequency generator 23 is connected, which supplied electrode 18 with energy, whereby the corona discharge in the discharge gap increases the surface tension of wall 19 of the cup-like container 17. The discharge current is removed via the mandrel 2, which is connected as counter-electrode.

This process is carried out over a full revolution of the cup-like container 17, the guide shoe 3, which is electrically connected with the mandrel 2, continuously hugs the inside of wall 19, thereby preventing that a discharge gap forms on the inside of wall 19 in particular in the regions with little chamber, and thus there is no change of the surface tension on the inside of wall 19. With this arrangement a uniform surface tension variation on the outside of wall 19 is ensured.

After completion of one revolution of the cup-like container 17 the high-frequency generator 23 is disconnected, the drive 13 is stopped, and the drive wheels 14, 15 are raised together with the electrode 18, whereupon the treated cup-like container 17 can be removed. This entire cycle can readily be automated and can for example be integrated in printing systems for cup-like containers.

While a specific embodiment of the invention has been shown and described in detail to illustrate the application of the principles of the invention, it will be understood that the invention may be embodied otherwise without departing from such principles.

What is claimed is:

1. An apparatus for changing the surface tension of cup-like containers of round, oval and similar forms without corners by a corona treatment, wherein a cup-like container is adapted to rest with its interior side walls on a mandrel, comprising a rotatable mandrel having an axle, said mandrel having a rotation symmetrical cross section of a diameter which is equal to or smaller than the smallest diameter of the cup-like container to be treated, at least one drive wheel overlying said container and the mandrel, the cup-like container being caused by driving engagement of said drive wheel as it is pressed against the outer side wall of the container to roll off on the mandrel, an electrode opposite to said mandrel which is connected as a counter electrode, an electrode associated with said mandrel, at least one guide shoe pivotal on said axle and being electrically connected with said mandrel and having a surface toward the inside of a wall of the cup-like container extending initially away from said mandrel in a tangential direction and being spring supported in such a way that said guide shoe applied against the wall of the cup-like container.

2. An apparatus according to claim 1, wherein said electrode is arranged next to at least one drive wheel which bears against only an edge region of the outer wall of said cup-like container.

3. An apparatus for changing the surface tension of cup-like containers, comprising a rotatable mandrel having a rotatable axle and having a surface over which the container is supported, a cup-shaped container having an open top and having an annular interior wall supported on said mandrel, a guide shoe pivotally mounted on said axle and having a curved portion positionable between the interior wall of said container and said mandrel, biasing means biasing said guide shoe into engagement with the cup-shaped container, a drive wheel overlying said mandrel and engageable against the cup-shaped container to cause the container to roll on said mandrel and electrode means adjacent said guide show for exposing the cup-shaped container to a corona discharge during its rotation.

* * * * *